US008086360B2

(12) United States Patent
Hilmersson

(10) Patent No.: US 8,086,360 B2
(45) Date of Patent: Dec. 27, 2011

(54) DEVICE AND A METHOD FOR MOVING A JET MEMBER

(75) Inventor: Ronnie Hilmersson, Holsbybrunn (SE)

(73) Assignee: Aquajet Systems Holding AB, Holsbybrunn (SE)

( * ) Notice: Subject to any disclaimer, the term of this patent is extended or adjusted under 35 U.S.C. 154(b) by 380 days.

(21) Appl. No.: 12/308,587

(22) PCT Filed: Jun. 14, 2007

(86) PCT No.: PCT/SE2007/050422
§ 371 (c)(1),
(2), (4) Date: Dec. 18, 2008

(87) PCT Pub. No.: WO2007/149039
PCT Pub. Date: Dec. 27, 2007

(65) Prior Publication Data

US 2010/0241288 A1 Sep. 23, 2010

(30) Foreign Application Priority Data

Jun. 22, 2006 (SE) ....................................... 0601367

(51) Int. Cl.
*G05D 1/02* (2006.01)
*B60P 3/30* (2006.01)
*E01C 23/12* (2006.01)

(52) U.S. Cl. ..... 700/302; 700/282; 700/301; 137/899.1; 404/75; 404/90; 299/17; 239/752

(58) Field of Classification Search .................. 700/302, 700/301, 282; 137/899, 899.1; 404/75, 90; 299/17; 239/752
See application file for complete search history.

(56) References Cited

U.S. PATENT DOCUMENTS 4,055,488 A * 10/1977 Siri et al. ...................... 209/173
4,854,770 A * 8/1989 Puchala et al. .................. 404/75
5,452,966 A 9/1995 Swisher, Jr.

FOREIGN PATENT DOCUMENTS

WO 92/03269 3/1992
WO 98/15690 4/1998
WO 2005/090684 9/2005

* cited by examiner

*Primary Examiner* — Ramesh Patel
*Assistant Examiner* — Steven Garland
(74) *Attorney, Agent, or Firm* — Dilworth & Barrese, LLP.

(57) ABSTRACT

A device for moving a jet member on a carriage (6) between two selectable extreme positions along a guide (5) has means for detecting that the carriage has reached a selectable extreme position, said means comprising members (24, 25) adapted to form a mechanical resistance against continued movement of the carriage so as to influence the flow of hydraulic liquid in an hydraulic circuit (27) of a hydraulic drive arrangement for moving the carriage. Members (31) are arranged to sense a parameter of the hydraulic liquid, the magnitude of which is depending upon the flow of hydraulic liquid in the hydraulic circuit, and send information about the magnitude of this parameter to a control unit (14) adapted to control the turning of the carriage on the basis of this information.

16 Claims, 3 Drawing Sheets

Fig 6

DEVICE AND A METHOD FOR MOVING A JET MEMBER

FIELD OF THE INVENTION AND PRIOR ART

The present invention relates to a device for moving a jet member, so as to through a high pressure jet of liquid obtain material removing treatment of a material layer as well as a method for moving a jet member according to the preambles of the appended independent claims 1 and 15.

The layer to be treated consists preferably of concrete, but it may also consist of another material. Primarily, the treatment is intended to have the purpose to remove weakened material from the layer. It may then be a question of removing weakened concrete from concrete layers on roads, bridges and a variety of building structures, whereupon the removed concrete may be replaced by new concrete. Preferably, the high pressure liquid consists of water.

A device and a method of the type defined in the introduction are for example described in our European patent 0 544 775. Such a device has means adapted to detect that the carriage has reached a selectable extreme position in the form of flags or the like arranged in different positions along a beam in parallel with the movement path of the carriage so as to define the extreme positions of the carriage and a sensor arranged on the carriage or on a part connected therewith designed to sense that the carriage has arrived just in front of such a flag and inform the control unit thereabout, so that this may directly or with a certain delay stop and turn the carriage. Such a sensor arranged on the carriage is through a cabling electrically connected to a control cabinet of the vehicle, in which also the control unit is arranged. 90% of all operations disturbances in the electric system of devices of this type already known emanates from this cabling outside the cabinet to the sensor on the carriage, since the environment in which the cabling is running is very tough with concrete pieces and the like flying around, at the same time as there is a risk that the cables may catch or touch anything when rotating the assembly to which the jet member with carriage belong during the material removing treatment of material layers of different types of objects.

The invention is directed both to devices of the type defined in the introduction, in which a pivoting of the jet member with respect to the carriage is intended to take place when the carriage has reached a said extreme position and the carriage is standing still and then the jet member keeps this direction until the carriage reaches the opposite extreme position, and more complicated devices in which a pivoting of the jet member with respect to the carriage starts when the carriage approaches said extreme position and is possibly continued until the carriage has changed direction and moves somewhat away from the extreme position in question.

SUMMARY OF THE INVENTION

The object of the present invention is to provide a device and a method of the type defined in the introduction, which makes it possible to reduce the risk of the operation disturbances mentioned above of such devices and methods already known.

This object is according to the invention obtained by providing such a device, in which said means comprises members designed to form a mechanical resistance to a further movement of the carriage when the carriage reaches the respective said extreme position or a region close to said extreme position adapted to influence the flow of hydraulic liquid through said hydraulic circuit of the hydraulic drive arrangement as well as members, adapted to sense a parameter of the hydraulic liquid, the magnitude of which is dependent upon said flow, and send information about the magnitude of this parameter to the control unit, and the control unit is adapted to control the turning of the carriage on the basis of information about the magnitude of said parameter.

By arranging such a mechanical resistance to continued movement of the carriage and sensing said parameter of the hydraulic liquid it gets possible to manage without any sensor on the carriage if desired and by that manage without said cabling responsible for the main part of the operation disturbances in the electric system of such devices already known. The means for detecting that the carriage has reached a said extreme position gets by that very robust and the entire device may be made more robust than before. A measuring of such a parameter depending upon the flow of the hydraulic liquid is also very easy to realize.

According to an embodiment of the invention the control unit is adapted to compare the magnitude of a change of said magnitude of said parameter with a predetermined value and determine that an extreme position has been reached if the magnitude of the change exceeds said predetermined value and by that initiate turning of the carriage. The point of carrying out a comparison with such a predetermined value is that it may by that be avoided that a false conclusion is drawn with that the carriage has reached or is reaching its extreme position by the fact that for example reaction forces generated upon treatment by the jet member of a material layer in any point forms a considerable mechanical resistance to continued movement of the carriage.

According to another embodiment of the invention said sensing member is adapted to sense the pressure of the hydraulic liquid in said hydraulic circuit between a hydraulic pump and a hydraulic motor arranged at the carriage. This constitutes a reliable and easy way to detect that the carriage has arrived to a position in which said member forms a mechanical resistance to continued movement of the carriage. The restriction usually arranged in the hydraulic circuit between the hydraulic pump and the hydraulic motor is then utilized by designing the sensing member to measure the pressure of the hydraulic liquid downstream of the restriction. When there is no substantial resistance to the movement of the carriage a pressure fall will result across the restriction, so that a considerably lower pressure than the system pressure will be sensed by the sensing member, while this pressure will be increased for being the same as the system pressure in case the mechanical resistance would completely stop the carriage from moving further and by that stop the flow of hydraulic liquid in the hydraulic circuit.

According to an embodiment of the invention the mechanical resistance member is formed by a mechanical stop member arranged along the guide and to define said extreme position by forming an obstacle to and being hit by the carriage or a member connected thereto. This constitutes an extremely simple and reliable solution to the problem to be solved by the invention. When the carriage will hit the stop member it will stop in a well defined extreme position, since it may not move any longer, and this will influence the flow in the hydraulic circuit, so that the control unit through the sensing member gets information thereabout and may control the turning of the carriage on basis of said information. The control unit may then when receiving this information for instance start a pivoting of the jet member with respect to the carriage and/or a stepping forward of the entire vehicle before the hydraulic drive arrangement is controlled to start to move the carriage towards the other extreme position.

According to another embodiment of the invention said stop member is arranged movable and securable in different positions along the guide for determining the position for said extreme position and by that the working width of the jet member. Such a stop member is easy to move and secure in different positions so as to in an extremely easy way change the working width of the jet member while maintaining a completely reliable detection of the extreme positions for the carriage through the members adapted to sense said parameter of the hydraulic liquid.

According to another embodiment of the invention the sensing member is adapted to measure said hydraulic pressure each time the carriage has turned when starting the movement towards the opposite extreme position, and the control unit is adapted to store the initial pressure value so measured and determine that an extreme position has been reached when it receives information about an existing pressure exceeding this initial pressure value by a predetermined magnitude from said sensing member. It is by this no risk that it is determined that an extreme position has been reached when this is not the case, for example as a consequence of said reaction forces.

According to another embodiment of the invention the device comprises members for adjusting said predetermined magnitude of the pressure increase to different values, by which it may also be ensured that the predetermined magnitude is not set too high, so that reaching of an extreme position is detected with a certain time delay after reaching it and by that the jet member will during a short period of time treat a material layer on one and the same spot and by that an irregularity in the form of a pit may be created in the material layer.

According to another embodiment of the invention said sensing member is adapted to measure the speed of the flow of hydraulic liquid in the hydraulic circuit.

According to a further embodiment of the invention said mechanical resistance member comprises energy storing members adapted to generate an increasing resistance against movement of the carriage when this reaches a predetermined region close to the respective extreme position, and the control unit is adapted to determine that said extreme position has been reached when the magnitude of said parameter indicates that said resistance force exceeds a predetermined value. It gets by this possible to adjust the position of said extreme position by changing said predetermined value of the resistance force, and it gets also possible through measuring said parameter to determine that the carriage shall continue to move a certain distance after a certain resistance force has been obtained, so that it in this embodiment even will be possible to utilize the mechanical resistance members for controlling a pivoting of the jet member starting before reaching the extreme position.

According to another embodiment of the invention the device comprises members for adjusting the magnitude of said predetermined resistance force value, through which the position of said extreme position may be changed.

According to another embodiment of the invention the device further comprises a second sensing member arranged on said carriage and marks arranged along said guide, the second sensing member is designed to detect that the carriage reaches said marks and send information thereabout to the control unit, and the control unit is adapted to enable changing between by on one hand letting said means determine the position of said extreme positions and on the other letting said marks determine the position of said extreme positions. It gets by this possible in some operation situations to use a first sensing member and determine said extreme positions through the mechanical resistance member and measurement in the hydraulic circuit and in other situations determine the extreme position through said sensing members of the type discussed in the introduction arranged on the carriage. It is also possible to use that type of extreme position determination and if the risks for disturbances in any particular working situation are judged to be high this sensing member may be switched off and the sensing through the mechanical resistance member may be used. Another possibility through the existence of the two types of sensing members is to enable shifting between different working widths without having to carry out other actions than shifting between the sensing members for determining the extreme positions. This may be an advantage if the vehicle is difficult to access, for instance by the fact that the carriage with the jet member is working on a high level along any wall or in a ceiling in a tunnel or the like.

According to another embodiment of the invention the jet member is arranged to pivot with respect to said carriage around an axle, and the control unit is adapted to control the jet member to pivot around said axle in connection with the arrival of the carriage to said extreme positions along the guide, so that the jet member may have a direction depending upon in which direction the carriage is moving along said guide. According to another embodiment of the invention the device comprises a displacing arrangement adapted to, during the pivoting movement of the jet member, as a consequence of the design of a mechanical connection between the jet member and the carriage, forceably displace the jet member substantially in the pivoting plane thereof around said axle with respect to the carriage so as to bring the mouth of a nozzle of the jet member to describe a moving motion in substantially one and the same plane, which is substantially perpendicular to the pivoting plane, as a consequence of the combined pivoting/displacement. The nozzle of the jet member may by this be moved in parallel with a layer being treated also if the jet member is pivoted so as to change direction.

The invention also relates to a method for moving a jet member according to the appended independent method claim. Advantages and advantageous features of such a method and the embodiments thereof defined in the dependent method claims appear as clearly as desired from the above description of the device according to the invention.

Further advantages as well as advantageous features of the invention appear from the following description and the other dependent claims.

DETAILED DESCRIPTION OF EMBODIMENTS OF THE INVENTION

Figure 1:
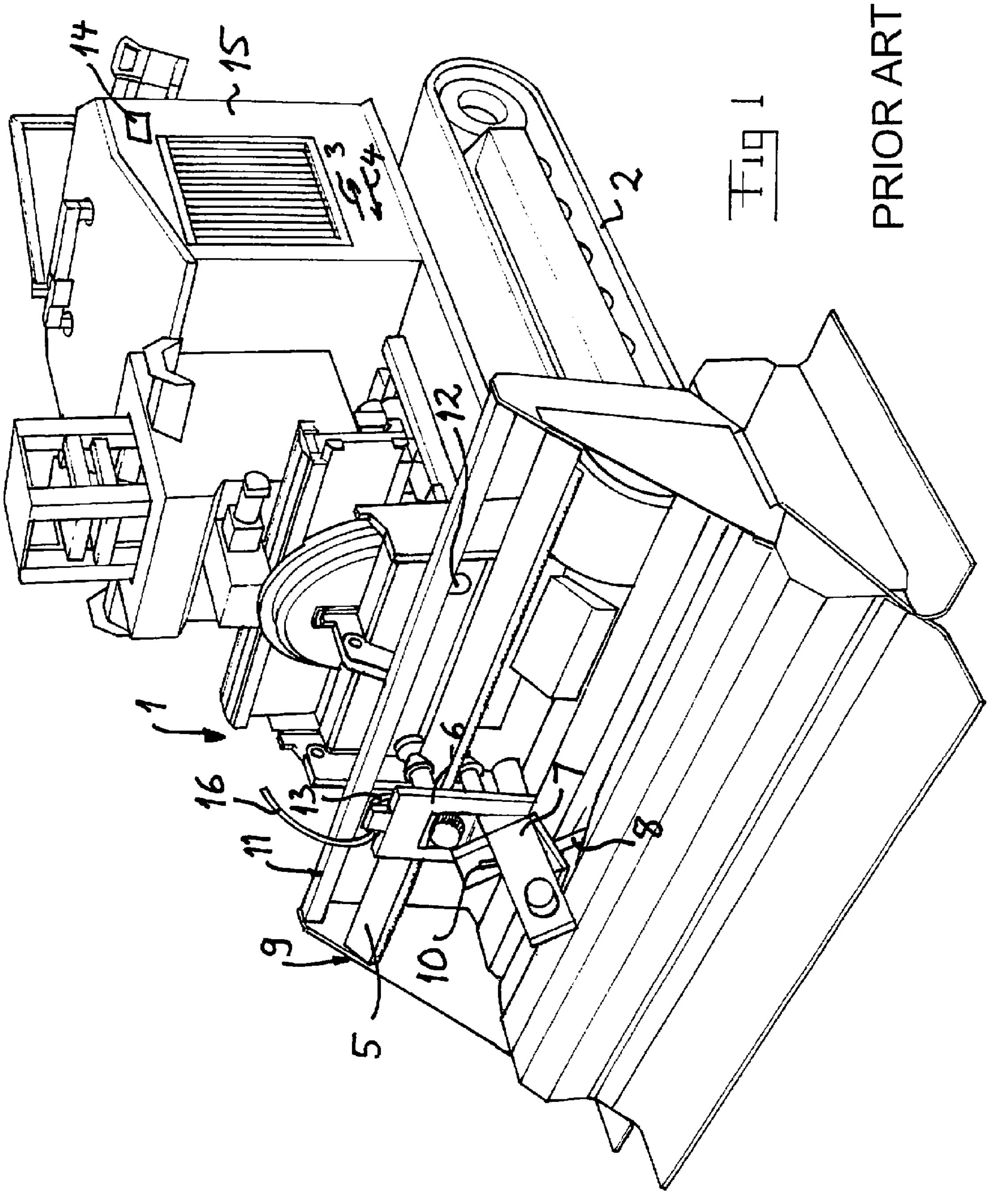
Fig 1 PRIOR ART
FIG. 1 is a schematic perspective view of a mobile unit, i.e. a vehicle, in which a device according to the prior art is implemented.

A device according to prior art of the type to which the present invention belongs may as illustrated in FIG. 1 be arranged on a mobile unit generally designated by 1. This has the character of a vehicle movable on a bedding, for example a layer of concrete, which is to be treated. The vehicle is here indicated to be of crawler-type with two driving tracks 2. The vehicle is movable in opposite directions as also indicated by the arrows 3 and 4.

An elongated guide 5 is arranged on the vehicle 1 and a carriage movable to and fro along this guide, which is generally designated by 6. A base portion 7 constitutes a part of the carriage 6. A tube-type jet member 8 is arranged on the base portion 7 for directing a high pressure jet of liquid against the bedding. The guide 5 in operation is intended to make an angle to the moving directions 3, 4 of the vehicle and preferably to extend transversely thereto. The guide 5, which may have the character of one or more beams, is in the example substantially rectilinear. The guide 5 also forms a part of a frame 9 mounted on the vehicle. The jet member 8 communicates through a conduit 10 with a source for supply of high pressure liquid, especially water, to the jet tube. This high pressure source may be arranged on the vehicle 1 or on a separate carriage or the like.

The frame 9 has also a member 11, such as a beam, extending substantially in parallel with the guide and on which marks 12 in the form of so-called flags are securable in selectable positions for defining the extreme positions of the movement of the carriage 6 along the guide. The carriage is for this sake also provided with a sensing member 13 adapted to detect that an extreme position is reached when it arrives directly in front of a mark 12 and send information thereabout to the control unit controlling different functions of the vehicle, which is indicated through the box 14 arranged in a cabinet 15 of the vehicle. The sensing member 13 is for this sake connected to the cabinet 15 through an indicated electric cable 16, which results in the problems described above. The device may be of such a type that the carriage 6 turns, i.e. changes direction, when the sensing member 13 is right in front of the marks 12 or turning takes place with a delay with respect to the reaching of this position and the jet member is then pivoted in a way mentioned below before said position is reached.

Figure 2:
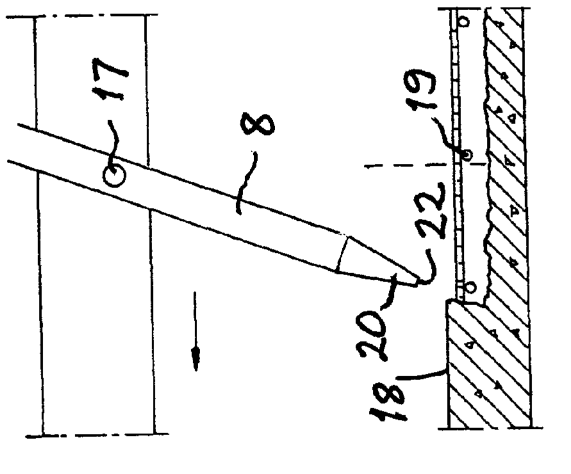
FIG. 2 is a schematic view of a jet member of a device according to the invention, which is moved along a layer treated by the jet thereof and is viewed perpendicularly to a guide, along which a carriage is movable.

The very way in which the jet member may treat a bedding will now be briefly described with reference made to FIGS. 2-4, even if the present invention is not directed thereto. The jet member 8 is arranged to pivot with respect to the base portion 7 around an axle 17 for changing the attack angle of the jet onto the layer 18 to be treated. It is shown in FIG. 2 how the jet member 8 moves to the left in a transversal motion while removing material, here concrete. The concrete layer is reinforced by a lattice-like grid of reinforcement bars 19, and by keeping the jet member 8 inclined the jet will reach under these reinforcement bars. The nozzle 20 of the jet member points in this case in the movement direction of the carriage, and it will do so also when the carriage has changed moving direction.

The control unit 14, preferably in the form of a suitable computer unit, is adapted, when the carriage has reached an extreme position along the guide to control drive members not shown to pivot the jet member 8 around the axle 17 when the carriage has reached the respective end position. Another drive member in the form of a hydraulic drive arrangement, which will be described further below, is adapted to be controlled by the control unit 14 for moving the carriage one or several times to and fro between the extreme positions before the tracks 2 are driven for moving the entire vehicle forwards by one step, so-called incrementing, treating a new area of the layer to be treated.

Figure 4:
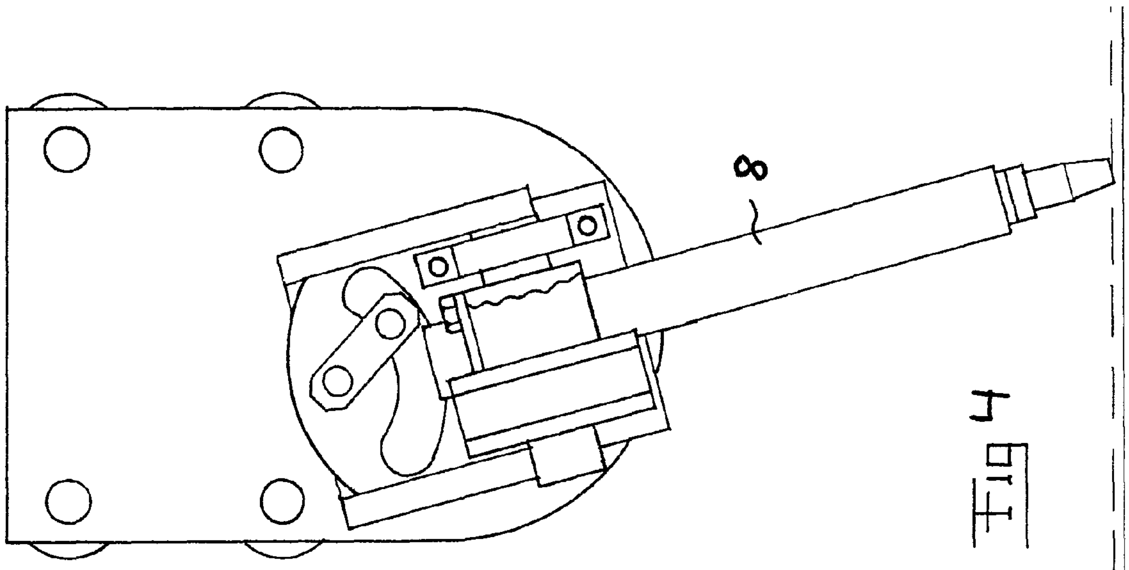
FIGS. 3 and 4 are more detailed views of the carriage of the device according to the present invention in different operation positions.
Figure 3:
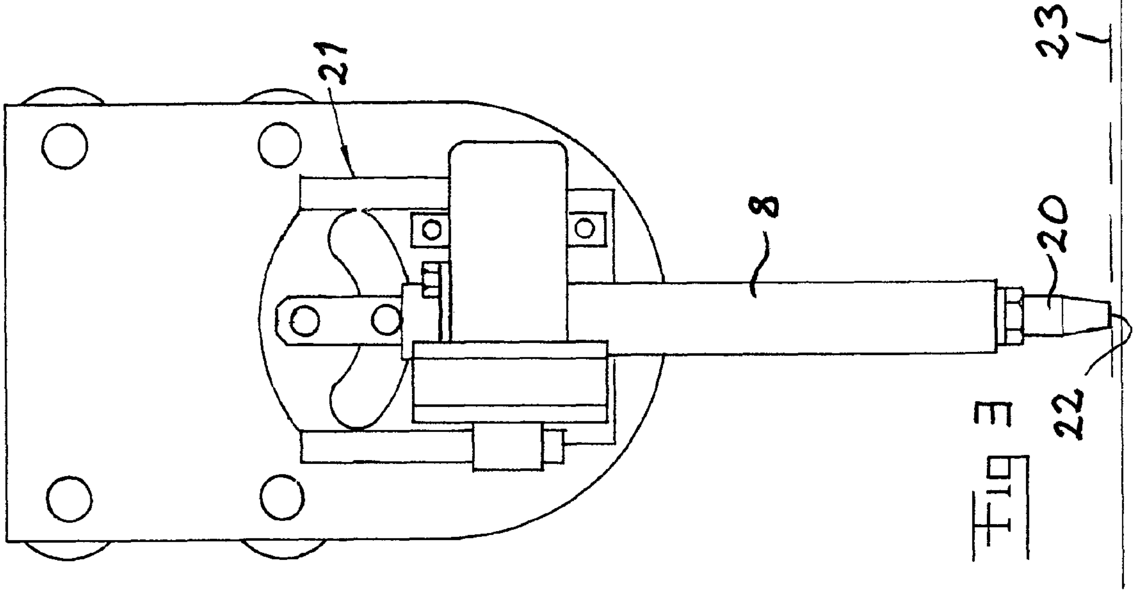

It is schematically illustrated in FIGS. 3 and 4 how a control member 21 is arranged to control the jet member and have the pivot axle thereof moved with respect to the base portion 7 of the carriage while pivoting the jet member with respect to the base portion, so that the mouth 22 of the nozzle of the jet member describes a motion in substantially one and the same plane 23, which is substantially perpendicular to the plane in which the jet member pivots. The construction of the guide member for obtaining this motion of said mouth 22 in the plane 23 may be the same as described in EP 1 029 127 B1 with reference to FIGS. 8-10, and it will not be disclosed more in detail here.

Figure 5:
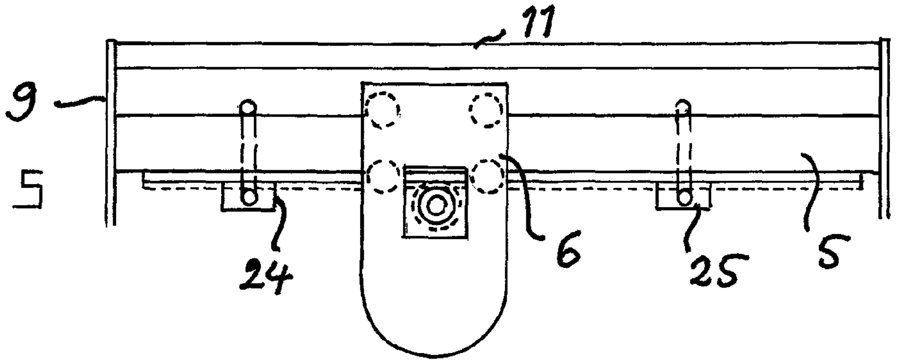
FIG. 5 is a schematic view illustrating a part of a device according to a first embodiment of the invention.
Figure 6:
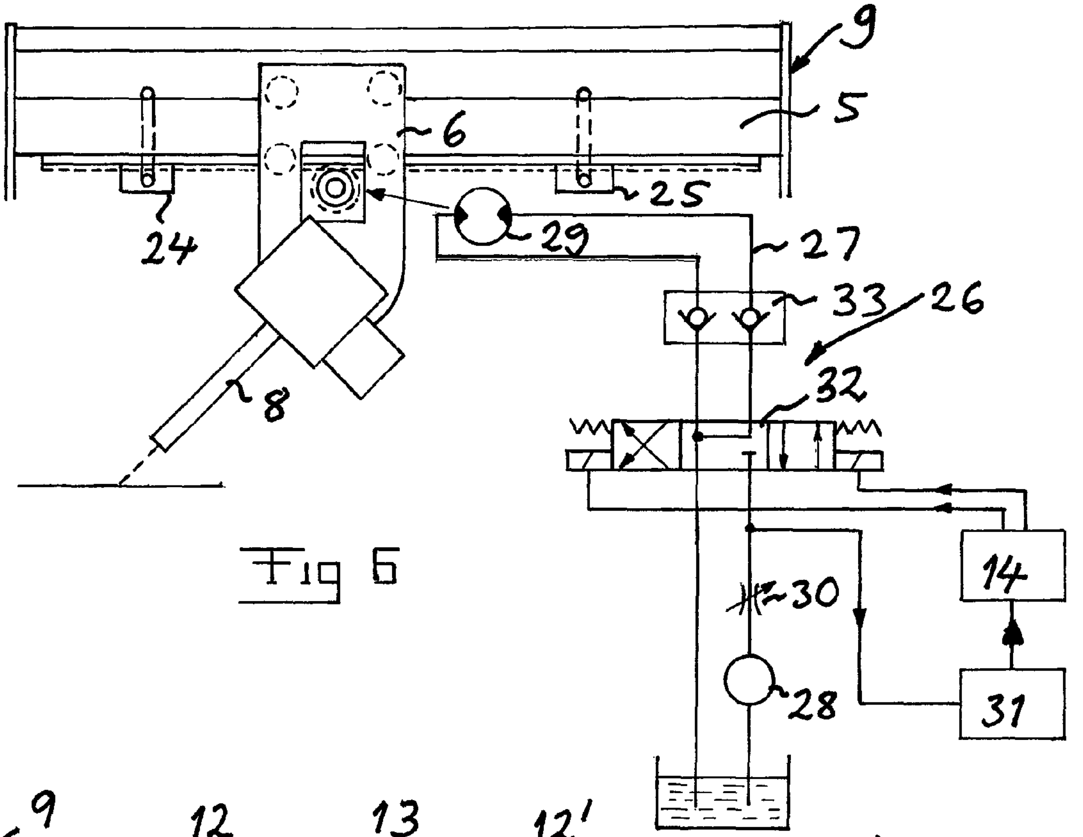
FIG. 6 is a simplified diagram illustrating the function of a device according to an embodiment of the invention.

A part of the frame 9 of a device according to an embodiment of the invention is schematically illustrated in FIG. 5. This differs from the frame of the device according to FIG. 1 by the fact that the carriage 6 has no sensing member and the element 11 has neither any marks. Mechanical stop members 24, 25 in the form of blocks are instead securable by tightening in the movement path of the carriage along the guide 5 in different positions along the guide for defining extreme positions for the movement of the carriage by forming obstacles and being hit by the carriage or a part connected thereto. No sensing member on the carriage with electrical conductors running between this and the cabinet 15 of the vehicle is for that sake needed. How a device of this type functions will now be explained while simultaneously making reference to FIG. 6. It is illustrated in FIG. 6 how the device has a hydraulic drive arrangement 26 having a hydraulic circuit 27 with a hydraulic pump 28 adapted to pump hydraulic liquid to a hydraulic motor 29 arranged on the carriage 6 for moving the carriage along the guide 5 until it hits the mechanical stop members 24, 25. The hydraulic circuit has a restriction 30 downstream of the pump 28 and downstream of the restriction a sensing member 31 in the form of a pressure sensor adapted to sense the pressure of the hydraulic liquid downstream of the restriction and send information thereabout to a control unit 14. The control unit 14 is adapted to control a direction valve 32 on the basis of information from the pressure sensor 31 to let through or stop the flow of hydraulic liquid from the pump 28 to one or the other side of the hydraulic motor 29 depending upon the movement direction of the carriage. A so-called hydraulic lock 33 in the form of a non-return valve is arranged in the hydraulic circuit between the hydraulic motor 29 and the direction valve and this is automatically closed when no pressure is applied thereto through the hydraulic liquid flowing through the direction valve 32.

The function of the device schematically illustrated in FIG. 6 is as follows: when the carriage 6 is to be moved towards one of the extreme positions along the guide 5 the hydraulic pump 28 pumps hydraulic liquid through the restriction 30 towards the direction valve 32. The hydraulic liquid flows through the direction valve and the overcenter valve to the hydraulic motor 29 and the carriage moves along the guide 5. The restriction 30 will form a pressure fall of for example 40 bars, which means that the pressure sensor 31 will indicate a pressure being lower than the system pressure existing at the pump, such as 100 bars (system pressure)−40 bars (pressure fall)=60 bars. This value is stored in the control unit 14. When then the carriage 6 reaches one of the mechanical stops, such as the stop 25, the hydraulic liquid stops to flow through the hydraulic motor as a consequence of the stopping of the motor owing to the mechanical stop, so that the pressure fall formed by the restriction 30 disappears and the pressure at the pressure sensor is raised to the system pressure. The control unit 14 receives information about this and notes that an exceeding of the pressure raise thus occurred by a predetermined value means that it is determined that the carriage has reached an extreme position. The control unit then controls the direction valve 32 to be closed, which results in closing of the hydraulic lock 33, so that the hydraulic liquid is kept in the loop between the overcenter valve and the hydraulic motor and the carriage 6 is kept in the extreme position, which is important if the control is so directed that the carriage for example moves vertically, since otherwise the gravitation could result in a fall of the carriage 6 from the extreme position. The control unit 14 thereupon carries out a control of the jet member to be pivoted, such as around the axle 17 according to FIG. 2, and the vehicle is possibly taken a step forward before the control unit controls the direction valve to open so that the hydraulic liquid from the pump 28 is led in the opposite direction in the hydraulic circuit between the direction valve and the hydraulic motor 29 and the carriage is by that moved in the opposite direction as before. The pressure is then preferably measured and the pressure value downstream of the restriction when starting this movement is stored so as to then be used as comparison value for determining if a pressure increase measured is to be considered to emanate from reaching of a said extreme position or not.

It may by this construction of the device be refrained from using a sensing member arranged on the carriage and by that may all the electronic of the vehicle be moved from the exposed front of the vehicle and into the cabinet or under the engine casing, where it is well protected. It is also possible to manage without electric cables externally of said cabinet. Another advantage is that when other equipment is applied on the vehicle, such as on the frame thereof, no position sensor has to be connected and no cables have to be joined.

Figure 7:
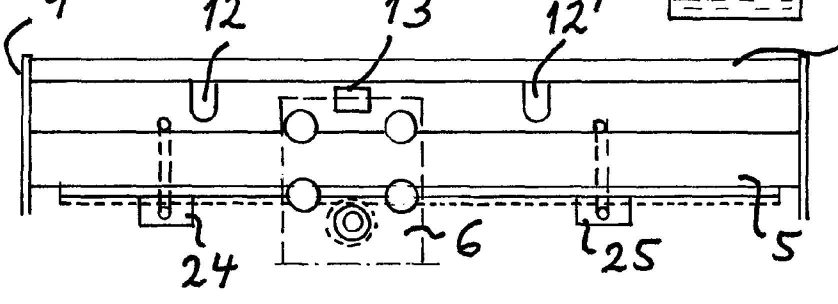
FIG. 7 is a view corresponding to FIG. 5 of a part of a device according to a second embodiment of the invention.

FIG. 7 illustrates a device according to a second embodiment of the invention, which differs from the one according to FIG. 5 by a combination of the mechanical stop members 24, 25 with a sensor 13 on the carriage and marks 12, 12' on the element 11. It may by this be shifted between the two means for extreme position determination, or one of them may be a spare member for the other. Another alternative is to arrange the mechanical stop members in positions defining a larger desired working width for the device and the marks 12, 12' in positions defining a smaller desired working width of the device, in the case two different working widths are to be combined, for example when treating a bridge column. It may in such a case be shifted between these two working widths by shifting between determination of the working width through the mechanical stop members 24, 25 and determination thereof through the marks 12, 12', so that neither the mechanical stop members nor the marks have to be moved for changing the working width, which is particularly advantageous when the frame 9 with the jet member is located in a position comparatively hard to reach.

Figure 8:
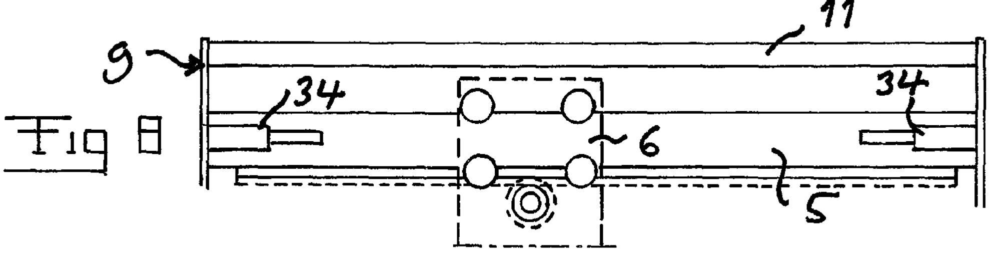
FIG. 8 is a view corresponding to FIG. 5 of a part of a device according to a third embodiment of the invention.

FIG. 8 illustrates schematically a third possible embodiment of the invention, in which the device is provided with members forming a mechanical resistance to continued movement of the carriage in the form of energy storing members 34, such as gas springs, adapted to generate an increasing resistance to the movement of the carriage when this reaches a predetermined region close to the respective extreme position. These energy storing members 34 may be designed to influence the flow in the hydraulic circuit of the hydraulic drive arrangement so that a parameter depending thereupon, such as the flow speed of pressure, may be measured so as to determine if an extreme position has been reached or not through comparison with a predetermined value. By changing this predetermined value the position of said extreme position could then be changed.

The device is of course not in any way restricted to the embodiments described above, but many possibilities to modifications thereof will be apparent to a person with skill in the art without departing from the basic idea of the invention as defined in the appended claims.

The mechanical stop members does not for example have to be movable, and they may even be formed by flanks of the frame of the machine or flanks forming the end of the movement path of the carriage. It would also be possible to have only one mechanical stop member movable, while the other is formed by a part being fixed with respect to the guide, such as an end wall of the guide. These stop members could also be hydraulically adjustable between different positions, which may be advantageous when carrying out work on higher levels with a far upwards extending frame.

It would also be possible to arrange mechanical resistance members for determining when the jet member has pivoted enough through sensing the parameters depending upon the flow of the hydraulic liquid when the carriage is located in or close to a said extreme position.

The invention claimed is:

1. A device for moving a jet member (8), which is arranged on a carriage (6) arranged on a vehicle for directing a high pressure jet of liquid against a material layer for material removing treatment of the material layer said carriage being movable to and fro along a guide (5) between two selectable extreme positions along the guide, said device comprising a hydraulic drive arrangement (26) having a hydraulic circuit (27) and being arranged to create the movement of the carriage along the guide, means (12, 21', 13, 24, 25, 31) adapted to detect that the carriage has reached a selectable extreme position along the guide, where turning of the carriage is to take place, as well as a control unit (14) adapted to control the hydraulic drive arrangement and by that said movement of the carriage along the guide, wherein said means comprises a member (24, 25, 34) designed to form a mechanical resistance to a further movement of the carriage when the carriage reaches the respective said extreme position or a region close to said extreme position adapted to influence the flow of hydraulic liquid through said hydraulic circuit of the hydraulic drive arrangement, and a member (31) adapted to sense a parameter of the hydraulic liquid, the magnitude of which is dependent upon said flow, and send information about the magnitude of this parameter to the control unit (14), and the control unit is adapted to control the turning of the carriage on the basis of information about the magnitude of said parameter, and the control unit (14) is adapted to compare the magnitude of a change of said magnitude of said parameter with a predetermined value and determine that an extreme position has been reached responsive to the magnitude of the change exceeding said predetermined value and by that initiate the turning of the carriage (6).

2. A device according to claim 1, wherein said sensing member (31) is adapted to sense the pressure of the hydraulic liquid in said hydraulic circuit (27) between a hydraulic pump (28) and a hydraulic motor (29) arranged at the carriage.

3. A device according to claim 1, wherein the mechanical resistance member is formed by a mechanical stop member (24, 25) arranged along the guide (5) and to define said extreme position by forming an obstacle to and being hit by the carriage (6) or a member connected thereto.

4. A device according to claim 3, wherein said stop member (24, 25) is movable and securable in different positions along the guide (5) for determining an extreme position and by that working width of said jet member (8).

5. A device according to claim 1, wherein the jet member (8) is arranged to pivot with respect to said carriage (6) around an axle, and the control unit (14) is adapted to control the jet member to pivot around said axle in connection with the arrival of the carriage to said extreme positions along the guide.

6. A device for moving a jet member (8), which is arranged on a carriage (6) arranged on a vehicle for directing a high pressure jet of liquid against a material layer for material removing treatment of the material layer, said carriage being movable to and fro along a guide (5) between two selectable extreme positions along the guide, said device comprising a hydraulic drive arrangement (26) having a hydraulic circuit (27) and being arranged to create the movement of the carriage along the guide, means (12, 21', 13, 24, 25, 31) adapted to detect that the carriage has reached a selectable extreme position along the guide, where turning of the carriage is to take place, as well as a control unit (14) adapted to control the hydraulic drive arrangement and by that said movement of the carriage along the guide, wherein said means comprises a member (24, 25, 34) designed to form a mechanical resistance to a further movement of the carriage when the carriage reaches the respective said extreme position or a region close to said extreme position adapted to influence the flow of hydraulic liquid through said hydraulic circuit of the hydraulic drive arrangement and a member (31) adapted to sense a parameter of the hydraulic liquid, the magnitude of which is dependent upon said flow, and send information about the magnitude of this parameter to the control unit (14), and the control unit is adapted to control the turning of the carriage on the basis of information about the magnitude of said parameter, said sensing member (31) is adapted to sense the pressure of the hydraulic liquid in said hydraulic circuit (27) between a hydraulic pump (28) and a hydraulic motor (29) arranged at the carriage, and the hydraulic circuit comprises a restriction (30), and the sensing member (31) is adapted to measure the pressure of the hydraulic liquid downstream of said restriction.

7. A device for moving a jet member (8), which is arranged on a carriage (6) arranged on a vehicle for directing a high pressure jet of liquid against a material layer for material removing treatment of the material layer, said carriage being movable to and fro along a guide (5) between two selectable extreme positions along the guide said device comprising a hydraulic drive arrangement (26) having a hydraulic circuit (27) and being arranged to create the movement of the carriage along the guide, means (12, 21', 13, 24, 25, 31) adapted to detect that the carriage has reached a selectable extreme position along the guide, where turning of the carriage is to take place, as well as a control unit (14) adapted to control the hydraulic drive arrangement and by that said movement of the carriage along the guide, wherein said means comprises a member (24, 25, 34) designed to form a mechanical resistance to a further movement of the carriage when the carriage reaches the respective said extreme position or a region close to said extreme position adapted to influence the flow of hydraulic liquid through said hydraulic circuit of the hydraulic drive arrangement, and a member (31) adapted to sense a parameter of the hydraulic liquid, the magnitude of which is dependent upon said flow, and send information about the magnitude of this parameter to the control unit 14 and the control unit is adapted to control the turning the carriage on the basis of information about the magnitude of said parameter, the mechanical resistance member is formed by a mechanical stop member (24, 25) arranged along the guide (5) and to define said extreme position by forming an obstacle to and being hit by the carriage (6) or a member connected thereto, the hydraulic circuit comprises a restriction (30), the sensing member (31) is adapted to measure the pressure of the hydraulic liquid downstream of said restriction, and the sensing member (31) is adapted to measure said hydraulic pressure each time the carriage (6) has turned when starting the movement towards the opposite extreme position, and the control unit (14) is adapted to store the pressure value so measured and determine that an extreme position has been reached when it receives information about an existing pressure exceeding this initial pressure value by a predetermined magnitude from said sensing member.

8. A device according to claim 7, wherein it comprises members (14) for adjusting said predetermined magnitude of the pressure increase to different values.

9. A device for moving a jet member (8), which is arranged on a carriage (6) arranged on a vehicle for directing a high pressure jet of liquid against a material layer for material removing treatment of the material layer, said carriage being movable to and fro along a guide (5) between two selectable extreme positions along the guide, said device comprising a hydraulic drive arrangement (26) having a hydraulic circuit (27) and being arranged to create the movement of the carriage along the guide, means (12, 21', 13, 24, 25, 31) adapted to detect that the carriage has reached a selectable extreme position along the guide, where turning of the carriage is to take place, as well as a control unit (14) adapted to control the hydraulic drive arrangement and by that said movement of the carriage along the guide, wherein said means comprises a member (24, 25, 34) designed to form a mechanical resistance to a further movement of the carriage when the carriage reaches the respective said extreme position or a region close to said extreme position adapted to influence the flow of hydraulic liquid through said hydraulic circuit of the hydraulic drive arrangement, and a member (31) adapted to sense a parameter of the hydraulic liquid, the magnitude of which is dependent upon said flow, and send information about the magnitude of this parameter to the control unit (14), and the control unit is adapted to control the turning of the carriage on the basis of information about the magnitude of said parameter, and said sensing member is adapted to measure speed of the flow of hydraulic liquid in the hydraulic circuit (27).

10. A device according to claim 9, wherein said mechanical resistance member comprises energy storing members (34) adapted to generate an increasing resistance against movement of the carriage (6) when this reaches a predetermined region close to the respective extreme position, and the control unit (14) is adapted to determine that said extreme position has been reached when the magnitude of said parameter indicates that said resistance force exceeds a predetermined value.

11. A device according to claim 10, wherein it comprises members (14) for adjusting the magnitude of said predetermined resistance force value.

12. A device for moving a jet member (8), which is arranged on a carriage (6) arranged on a vehicle for directing a high pressure jet of liquid against a material layer for material removing treatment of the material layer said carriage being movable to and fro along a guide (5) between two selectable extreme positions along the guide said device comprising a hydraulic drive arrangement (26) having a hydraulic circuit (27) and being arranged to create the movement of the carriage along the guide, means (12, 21', 13, 24, 25, 31) adapted to detect that the carriage has reached a selectable extreme position along the guide, where turning of the carriage is to take place, as well as a control unit (14) adapted to control the hydraulic drive arrangement and by that said movement of the carriage along the guide, wherein said means comprises a member (24, 25, 34) designed to form a mechanical resistance to a further movement of the carriage when the carriage reaches the respective said extreme position or a region close to said extreme position adapted to influence the flow of hydraulic liquid through said hydraulic circuit of the hydraulic drive arrangement, and a member (31) adapted to sense a parameter of the hydraulic liquid, the magnitude of which is dependent upon said flow, and send information about the magnitude of this parameter to the control unit (14), and the control unit is adapted to control the turning of the carriage on the basis of information about the magnitude of said parameter, and it further comprises a second sensing member (13) arranged on said carriage (6) and marks (12, 12') arranged along said guide, the second sensing member is designed to detect that the carriage reaches said marks and send information thereabout to the control unit (14), and the control unit is adapted to enable changing between by, on one hand, letting said detecting means determine the position of said extreme positions and, on the other hand, letting said marks determine the position of said extreme positions.

13. A method for moving a jet member, which is arranged on a carriage (6) arranged on a vehicle for directing a high pressure jet of liquid against a material layer for material removing treatment of the material layer, in which the carriage is movable to and fro along a guide (5) between two selectable extreme positions along the guide and brought to move alone the guide through influence from a hydraulic drive arrangement (26) having a hydraulic circuit, and it is detected that the carriage has reached an extreme position along the guide where turning of the carriage is to take place, wherein responsive to the carriage reaching the respective said extreme position or a region close to said extreme position, a mechanical resistance is formed against continued movement of the carriage, said resistance being adapted to influence the flow of hydraulic fluid through said hydraulic circuit of the hydraulic drive arrangement, a parameter of the hydraulic liquid, the magnitude of which is depending upon said flow, is sensed, and the turning of the carriage is controlled on the basis of information about the magnitude of said parameter, and the magnitude of a change of said magnitude of said parameter is compared with a predetermined value and it is determined that an extreme position has been reached responsive to the magnitude of said change exceeding the predetermined value and a turning of the carriage (6) is by that initiated.

14. A method according to claim 13, wherein the pressure of the hydraulic liquid in said hydraulic circuit (27) between a hydraulic pump (28) and a hydraulic motor (29) arranged at the carriage (6) is sensed as said parameter.

15. A method according to claim 13, wherein the mechanical resistance is formed by arranging a mechanical stop member (24, 25) along the guide (5), which defines said extreme position by forming an obstacle to and being hit by the carriage (6) or a part connected thereto.

16. A method for moving a jet member, which is arranged on a carriage (6) arranged on a vehicle for directing a high pressure jet of liquid against a material layer for material removing treatment of the material layer, in which the carriage is movable to and fro along a guide (5) between two selectable extreme positions along the guide and brought to move along the guide through influence from a hydraulic drive arrangement (26) having a hydraulic circuit, and it is detected that the carriage has reached an extreme position along the guide where turning of the carriage is to take place, wherein when the carriage reaches the respective said extreme position or a region close to said extreme position, a mechanical resistance is formed against continued movement of the carriage, said resistance being adapted to influence the flow of hydraulic fluid through said hydraulic circuit of the hydraulic drive arrangement, a parameter of the hydraulic liquid, the magnitude of which is depending upon said flow, is sensed, and the turning of the carriage is controlled on the basis of information about the magnitude of said parameter, the pressure of the hydraulic liquid in said hydraulic circuit (27) between a hydraulic pump (28) and a hydraulic motor (29) arranged at the carriage (6) is sensed as said parameter, and the pressure of the hydraulic liquid in the hydraulic circuit is measured downstream of a restriction (30) arranged in the hydraulic circuit between the hydraulic pump (28) and the hydraulic motor (29).

* * * * *